(12) United States Patent
Mori

(10) Patent No.: US 6,205,285 B1
(45) Date of Patent: Mar. 20, 2001

(54) VIDEO CD REPRODUCTION CONTROLLING DEVICE AND ITS CONTROLLING METHOD

(75) Inventor: Hideki Mori, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,277

(22) Filed: Jun. 4, 1998

(30) Foreign Application Priority Data

Jun. 5, 1997 (JP) .................................................. 9-147868

(51) Int. Cl.⁷ ....................................................... H04N 5/76
(52) U.S. Cl. ............................................. 386/95; 386/126
(58) Field of Search ............................... 386/46, 95, 106, 386/111, 112, 125, 126, 109; H04N 5/76

(56) References Cited

U.S. PATENT DOCUMENTS 5,701,385 * 12/1997 Katsuyama et al. .................. 386/106

FOREIGN PATENT DOCUMENTS 9-18822    1/1997  (JP) .

\* cited by examiner

*Primary Examiner*—Huy Nguyen
(74) *Attorney, Agent, or Firm*—Scully, Scott, Murphy & Presser

(57) ABSTRACT

A video CD reproduction controlling device comprising a CD-drive, a CD-ROM decoder, an MPEG decoder, an address storing unit for storing disk reproduction information read out from the first track on a video CD, and a controller for controlling each of the above units, the controller storing an address of moving image data recorded on the first track included in the disk reproduction information, into the address storing unit, and controlling the CD-drive, the CD-ROM decoder, and the MPEG decoder so as to reproduce the moving image data recorded on the first track by use of the address stored in the address storing unit, in the reproduction of the moving image data at the reproduction mode with playback control-off.

12 Claims, 4 Drawing Sheets

VIDEO CD REPRODUCTION CONTROLLING DEVICE AND ITS CONTROLLING METHOD

BACKGROUNDS OF THE INVENTION

1. Field of the Invention

The present invention relates to a video CD reproduction controlling device and its controlling method for controlling reproduction of image data compressed and encoded by the MPEG-1 system recorded on a video CD.

2. Description of the Related Art

A video CD is capable of reproducing images and sounds for 74 minutes at the maximum, with compressed image data and sound data recorded in a time divided way on a CD-ROM format disk. Sounds and images including moving images and still images are recorded on a video CD in an efficient compress-encoding system by the MPEG-1 standard (hereinafter, referred to as the MPEG-1 system) regulated as the Advice ISO/IEC-11172-2 in 1993 by an expert group on ISO and CCITT (ISO/IEC, JTC1/SC2/WG8 (Moving Picture Expert Group: MPEG). The images and the sounds recorded on a video CD are reproduced by use of a video CD player with an MPEG video decoder and an MPEG audio decoder for respectively decoding MPEG-1 compression image data and MPEG-1 compression sound data mounted thereon.

FIG. 4 shows a schematic view of a construction of a disk for a video CD. With reference to FIG. 4, in the disk for the video CD, the data can be recorded on a lead-in L at the most inner portion, on a first track (T1), second track (T2), and third track (T3), successively to the maximum track 99. The lead-in L is the same as the lead-in provided in a musical CD (compact disc), where the information on each starting position for every track and the other necessary control information is recorded as the TOC information. The first track (T1) is a video CD data track with various disk information recorded therein. Further, the reproduction information T11 indicating the reproducing procedure of a disk and the image data T12 including moving images and still images can be recorded on the first track (T1). The second track (T2) and the later are MPEG-AV tracks respectively with one moving image recorded thereon. The MPEG data obtained by the time division and multiplexing of the compression image data and the compression sound data is recorded on these tracks.

A reproducing method of images and sounds recorded on a video CD includes a method for reproducing them in an interactive manner according to the reproduction information T11 recorded on the first track (T1) (referred to as reproduction with the playback control (PBC)-on) and a method for reproducing the second track (T2) and the later successively (referred to as reproduction with the PBC-off) regardless of the reproduction information T11.

FIG. 5 shows the constitution of the conventional video CD reproduction controlling device. The conventional video CD reproduction controlling device shown in FIG. 5 comprises a CD drive 51 for reading out the data recorded on a video CD, a CD-ROM decoder 52 for decoding the data read out through the CD drive 51 so to supply the reproduction data, an MPEG decoder 53 for decoding the MPEG data to supply image signals and sound signals when the reproduction data supplied from the CD-ROM decoder 52 is MPEG data, and a controller 54 for controlling the CD drive 51, the CD-ROM decoder 52, and the MPEG decoder 53.

The operation of the conventional video CD reproduction control in the case of PBC-off reproduction will be described with reference to the flow charts of FIGS. 4, 5, and 6. At the time of starting reproduction, if the PBC is set as off (Step 601), the controller 54 sends the CD drive 51 a seek request for the head of the second track (T2) that is the reproduction starting track (Step 602), in order to reproduce the images and sounds recorded on a disk set in the CD drive 51, and the data is read out and reproduced from the second track (T2) (Step 603). Namely, in case of the PBC-off reproduction, even if the image data T12 is recorded on the first track (T1), the same image data will be never reproduced, because the moving images recorded on the second track (T2) and the later are reproduced. The image data T12 recorded on the first track (T1) is to be reproduced only in case of the PBC-on reproduction.

Therefore, when a user wants to reproduce the images recorded on the first track (T1), he or she must select the PBC-on reproduction to perform the reproduction control of the video CD since it is impossible to reproduce the relevant images in the PBC-off reproduction.

There exists a video CD on which all the moving image data is recorded on the first track (T1) and no moving image data is recorded on the second track (T2) and the later. Although it is not against the video CD standards, such a video CD is incapable of reproducing the moving images completely when the PBC-off is selected.

SUMMARY OF THE INVENTION

An object of the present invention is to provide a video CD reproduction controlling device and its controlling method capable of reproducing moving images recorded on the first track even in case of performing reproduction control of the video CD with the PBC-off.

Another object of the present invention is to provide a video CD reproduction controlling device and its controlling method capable of reproducing images recorded on the first track at the reproduction mode with the playback control off, thereby making it possible to reproduce, still at the reproduction mode with the playback control off, even such a video CD that only the first track includes moving images and the second track and the later tracks include no moving images.

According to the first aspect of the invention, a video CD reproduction controlling device, mounted with a video CD on which at least disk reproduction information indicating reproduction procedure for reproducing moving image data compressed and encoded in a predetermined compression method, is recorded on the first track and the compressed and encoded moving image data is, if necessary, recorded thereon, and the compressed and encoded moving image data is recorded on the second track and the later, for controlling reproduction of moving image data recorded on the video CD, the video CD reproduction controlling device comprises a CD drive, mounted with a video CD, for reading out the data recorded on the video CD, a first decoding means for decoding the data read out through the CD drive, so to supply reproduction data, a second decoding means for decoding the moving image data, so to supply image signals and sound signals, when the reproduction data supplied from the first decoding means is the moving image data compressed and encoded by the predetermined compression method, a storing means for storing the disk reproduction information read out from the first track, of the reproduction data supplied from the first decoding means, and a controlling means for controlling the CD drive and the first and second decoding means, the controlling means stores into the storing means, an address of the moving image data recorded on the first track, included in the disk reproduction information read out from the first track, of the reproduction data supplied from the first decoding means, and controls the CD drive and the first and second decoding means so as to reproduce the moving image data recorded on the first track by use of the address stored in the storing means, in the reproduction of the moving image data at the reproduction mode with playback control-off.

In the preferred construction, when storing into the storing means, the address of the moving image data recorded on the first track, the controlling means checks the data recorded on the first track in every one frame, so to judge whether the data is moving image data or not, and if judging that the data is moving image data, it stores the address of the data into the storing means.

In the preferred construction, the controlling means controls the first and second decoding means so as to reproduce the moving image data recorded on the first track and thereafter controls the CD-drive and the first and second decoding means so as to sequentially reproduce the moving image data recorded on the second track and the later.

In another preferred construction, the controlling means, when storing into the storing means, the address of the moving image data recorded on the first track, checks the data recorded on the first track in every one frame, so to judge whether the data is moving image data or not, and if judging that the data is moving image data, it stores the address of the data into the storing means, controls the first and second decoding means so as to reproduce the moving image data recorded on the first track and thereafter controls the CD-drive and the first and second decoding means so as to sequentially reproduce the moving image data recorded on the second track and the later.

According to the second aspect of the invention, a video CD reproduction controlling method for controlling reproduction of moving image data recorded on a video CD, by mounting in a CD-drive, the video CD on which at least disk reproduction information indicating reproduction procedure for reproducing moving image data compressed and encoded in a predetermined compression method, is recorded on the first track and the compressed and encoded moving image data is, if necessary, recorded thereon, and the compressed and encoded moving image data is recorded on the second track and the later, the video CD reproduction controlling method comprising the steps of a step of reading out the data recorded on the video CD mounted in the CD-drive, a step of decoding the data read out from the video CD, so to supply reproduction data, a step of storing an address of the moving image data recorded on the first track, included in the disk reproduction information read out from the first track, of the reproduction data, and a step of acquiring the moving image data recorded on the first track by use of the recorded address, in the reproduction of the moving image data at the reproduction mode with playback control-off.

In the preferred construction, the step of storing an address of the moving image data recorded on the first track includes a step of checking the data recorded on the first track in every one frame so to judge whether the data is moving image data or not, and a step of storing the address of the data when the data is judged to be moving image data.

In the preferred construction, a video CD reproduction controlling method further comprises a step of reproducing the moving image data recorded on the first track and thereafter sequentially reproducing the moving image data recorded on the second track and the later.

In another preferred construction, a video CD reproduction controlling method further comprises a step of reproducing the moving image data recorded on the first track and thereafter sequentially reproducing the moving image data recorded on the second track and the later, the step of storing an address of the moving image data recorded on the first track includes a step of checking the data recorded on the first track in every one frame so to judge whether the data is moving image data or not, and a step of storing the address of the data when the data is judged to be moving image data.

According to the third aspect of the invention, a computer readable memory storing a control program for controlling a video CD reproduction controlling device, provided with a CD-drive for mounting a video CD on which at least disk reproduction information indicating reproduction procedure for reproducing moving image data compressed and encoded in a predetermined compression method, is recorded on the first track and the compressed and encoded moving image data is, if necessary, recorded thereon, and the compressed and encoded moving image data is recorded on the second track and the later, for reproducing the moving image data recorded on the video CD, the control program comprising a step of reading out the data recorded on the video CD mounted in the CD-drive, a step of decoding the data read out from the video CD, so to supply reproduction data, a step of storing an address of the moving image data recorded on the first track, included in the disk reproduction information read out from the first track, of the reproduction data, and a step of acquiring the moving image data recorded on the first track by use of the recorded address, in the reproduction of the moving image data at the reproduction mode with playback control-off.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 3:
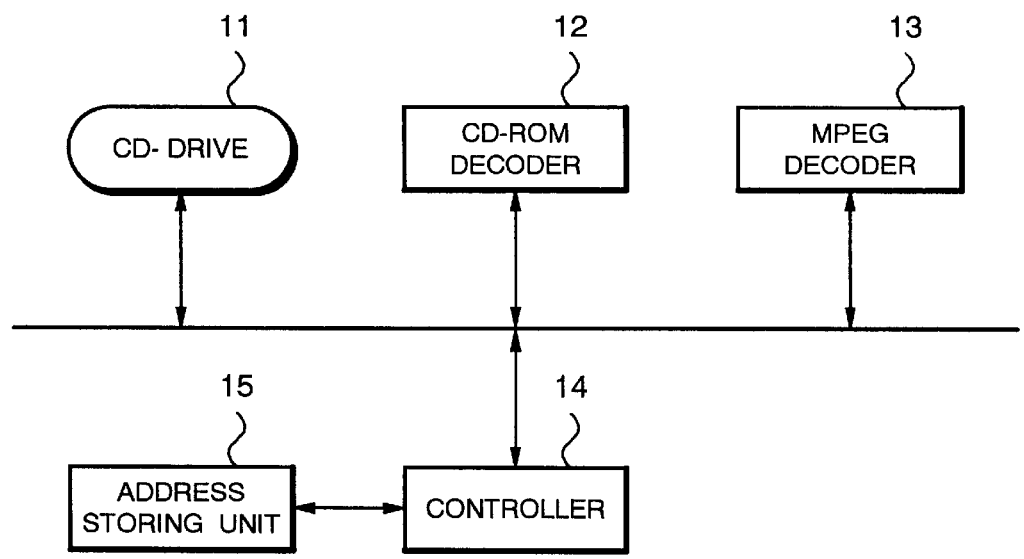
FIG. 3 is a block diagram showing the constitution of the video CD reproduction controlling device according to the embodiment.
Figure 4:
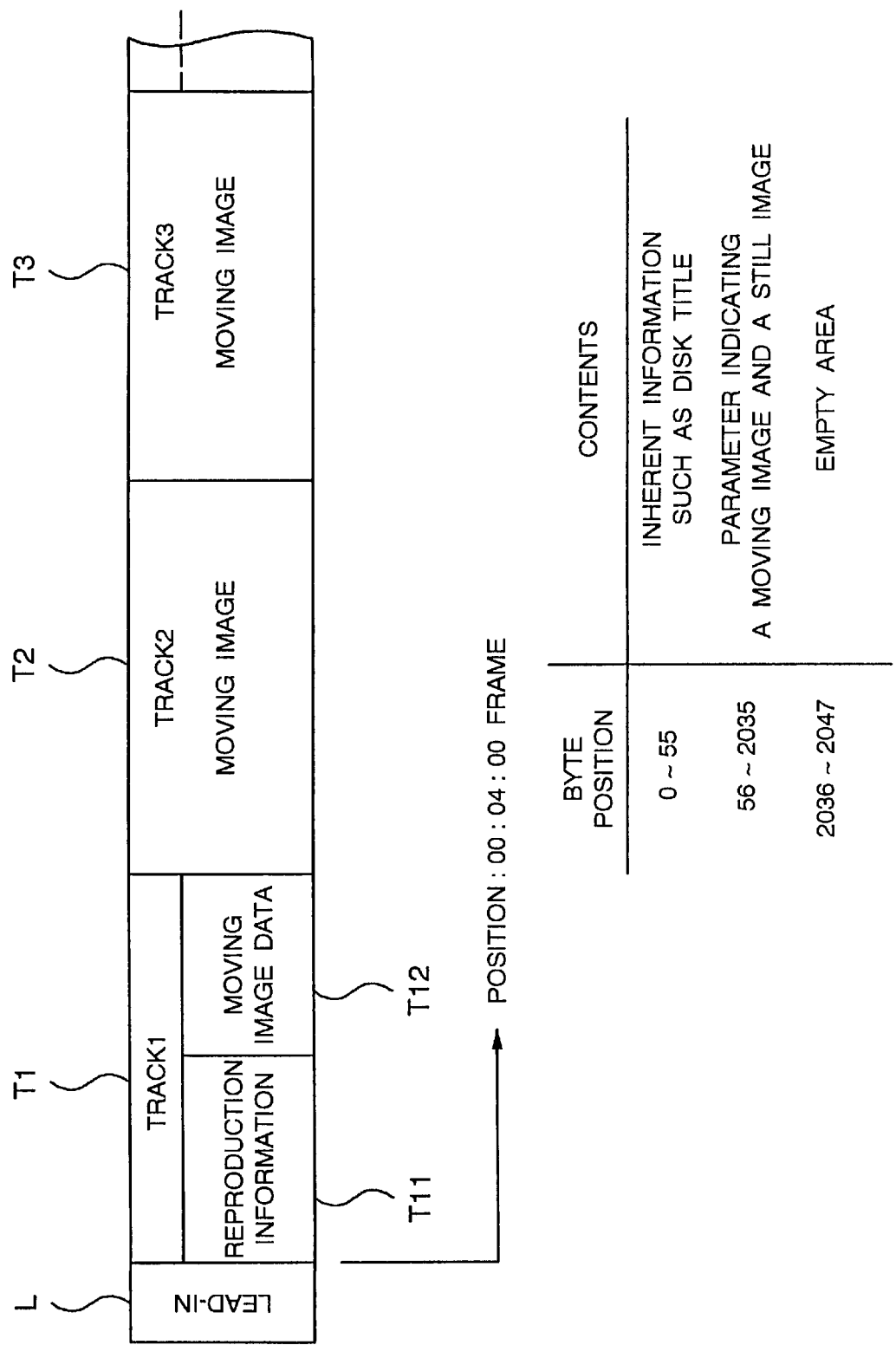
FIG. 4 is a schematic view for use in describing the constitution of a disk for a video CD.
Figure 5:
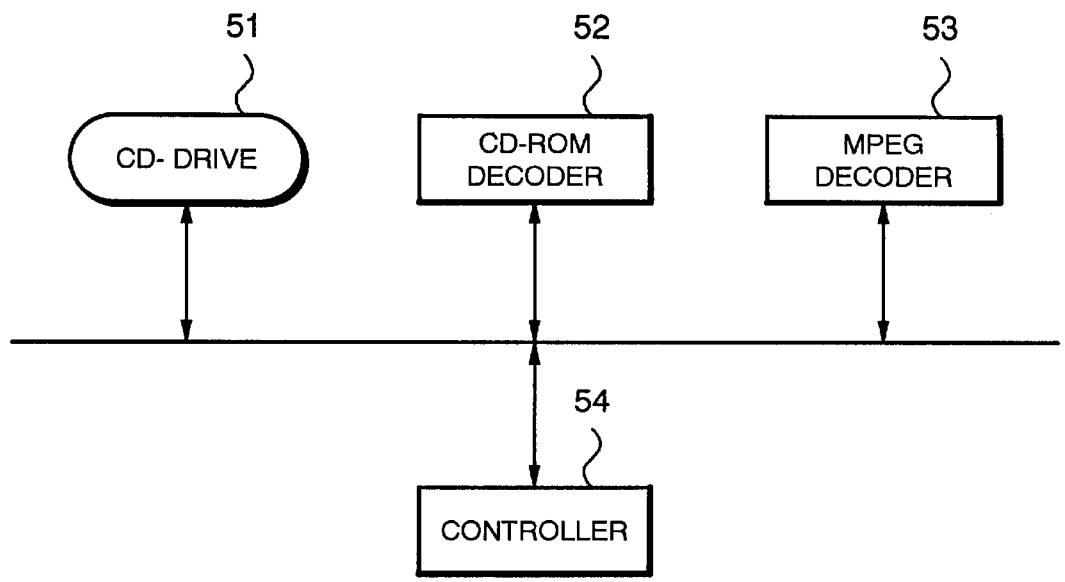
FIG. 5 is a block diagram showing a constitutional example of the conventional video CD reproduction controlling device.
Figure 6:
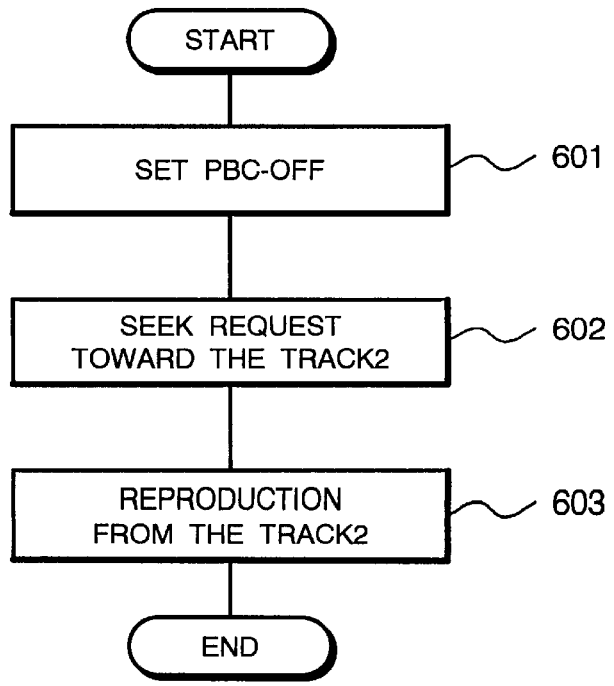
FIG. 6 is a flow chart showing the operation of the conventional video CD reproduction controlling device.

FIG. 3 is a block diagram showing the constitution of a video CD reproduction controlling device according to an embodiment of the present invention. With reference to FIG. 3, the video CD reproduction controlling device of the embodiment comprises a CD drive 11 for reading out the data recorded on a video CD, a CD-ROM decoder 12 for decoding the data read out through the CD-drive 11 to supply reproduction data, an MPEG decoder 13 for decoding the MPEG data to supply image signals and sound signals when the reproduction data supplied from the CD-ROM decoder 12 is MPEG data, a controller 14 for controlling the CD drive 11, the CD-ROM decoder 12, and the MPEG decoder 13, and an address storing unit 15 for storing an image data address recorded on the first track (T1) of the video CD. FIG. 3 shows only the characteristic components in the embodiment, while the description of the other general components is not shown there. The disk for the video CD for use in the embodiment is constituted as shown in FIG. 4.

Of the above components, the CD-ROM decoder 12, the MPEG decoder 13, and the controller 14 may be realized by a CPU controlled by a program and an internal memory. The computer program for controlling the CPU is provided, stored in a magnetic disk, an optical disk, a semiconductor memory, or the other general storing medium, and it is loaded in the internal memory so as to move the CPU to execute a predetermined function. The address storing unit 15 may be realized by an external storage such as a magnetic disk or the other, or an internal memory such as a RAM or the like.

Of the above components, the CD drive 11 is equipped with a video CD and then activated so as to read the data recorded on each track, according to the control of the controller 14.

The CD-ROM decoder 12 decodes the data read out from the video CD through the CD drive 11, thereby generating and supplying the reproduction data.

When the reproduction data generated by the CD-ROM decoder 12 is MPEG data, the MPEG decoder 13 decodes the MPEG data to supply image signals and sound signals.

The controller 14 controls each of the above function executing unit so as to reproduce images and sounds recorded on the video CD, in an interactive manner in the case of the PBC-on reproduction, or in a sequential reproduction manner in the case of the PBC-off reproduction, similarly to the reproduction control in the conventional video CD.

The controller 14 stores the address of the image data T12 recorded on the first track (T1) by use of the address storing unit 15 described below in the case of the PBC-off reproduction. The detail operation of the controller 14 in this case will be described later.

The address storing unit 15 stores the address of the image data T12 recorded on the first track (T1) and each address of the second track (T2) read out from the video CD by the controller 14.

Figure 1:
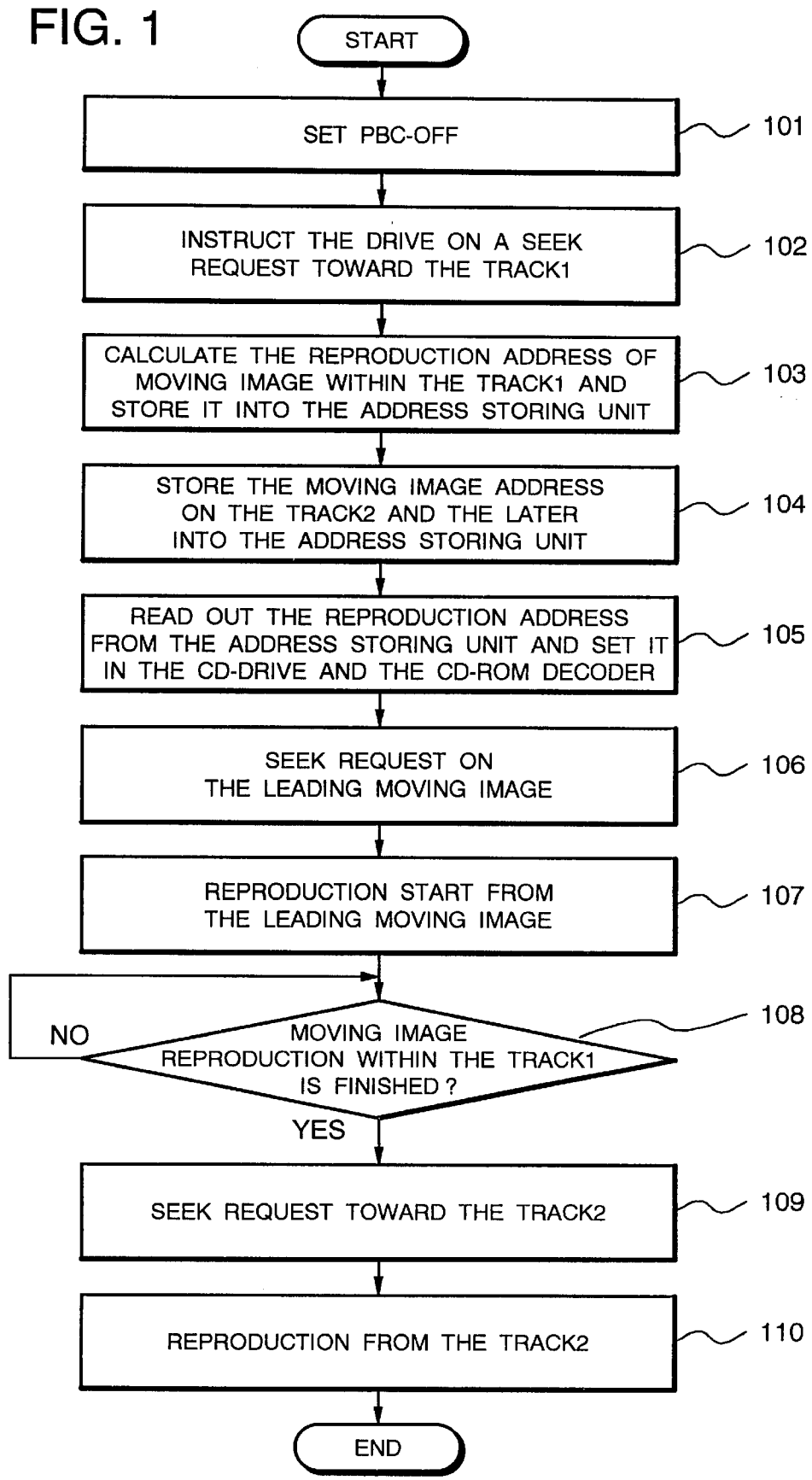
FIG. 1 is a flow chart showing the operation of a video CD reproduction controlling device according to an embodiment of the present invention.

This time, the operation of reproduction control of a video CD by the controller 14 will be described with reference to the flow charts of FIGS. 1 and 2. If setting the PCB off at the starting of reproduction (Step 101 in FIG. 1), the controller 14 instructs the CD drive 11 on a seek request toward the first track (T1) (Step 102). When the CD drive 11 gains access to the first track (T1) of the video CD, the controller 14 searches for the address of the image data T12 recorded on the first track (T1) and stores the obtained reproduction address in the address storing unit 15 (Step 103).

The operation for storing the address of the image data T12 recorded on the first track (T1) into the address storing unit 15 will be described in detail with reference to the flow chart of FIG. 2 indicating the operation of Step 103 concretely. In the video CD, the reproduction information T11 including the disk information within the first track (T1) begins with the first address 00 minute 04 seconds 00 frame and consists of a frame of 2048 bytes. Of 2048 bytes in one frame, the bytes from 0 to 55 correspond to the disk title and the other inherent information. The bytes from 56 to 2035 correspond to the information on the image data including the moving images and still images. The bytes from 2036 to 2047 correspond to the empty area. When the bit 3 and the bit 2 of the byte data corresponding to the image data are both "1", it is shown that this byte data is the moving image data of the MPEG-1 system.

Figure 2:
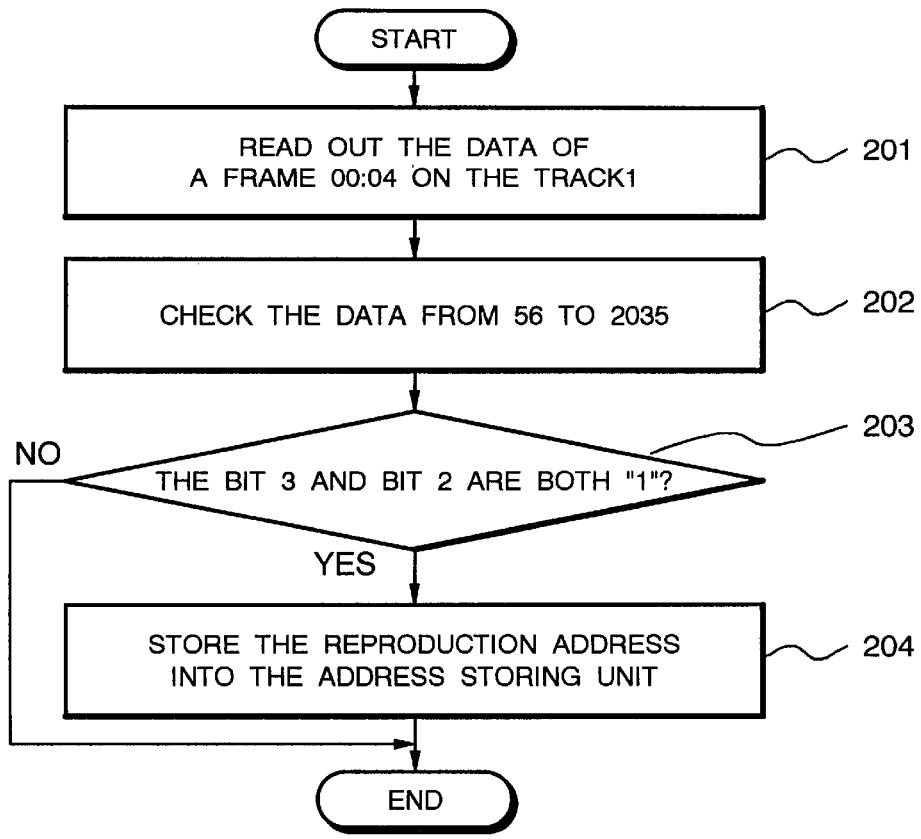
FIG. 2 is a flow chart showing in detail the operation of storing a reproduction address into an address storing unit in Step 103 of FIG. 1.

With reference to FIG. 2, the controller 14 reads out the data of the address 00 minute 04 seconds 00 frame of the reproduction information T11 on the first track (T1) at first (Step 201). Then, it checks the data from 56 to 2035 bytes indicating the information on the image data T12 within the frame (Step 202). When detecting the data indicating that the relevant byte data is of an moving image, in the check, in other words, when the bit 3 and the bit 2 of the relevant byte data are both "1", the controller 14 stores the address of the same byte data into the address storing unit 15 as the reproduction address (Steps 203 and 204). In this case, the value of the reproduction address is calculated by adding every 2 seconds per one byte of the checked data to the head address included in the one frame disk information read out before.

After having stored the address of the image data T12 recorded on the first track (T1) into the address storing unit 15 as mentioned above, the controller 14 reads out all the addresses of the second track (T2) and the later to store them into the address storing unit 15 (Step 104 in FIG. 1).

After the above processing, the data will be actually reproduced. The controller 14 reads out the reproduction address of the image data T12 within the first track (T1) stored in the address storing unit 15 at first, and sets it up in the CD drive 11 and the CD-ROM decoder 12 (Step 105). The CD drive 11 is instructed on a seek request toward the initial moving image of the image data T12 (Step 106).

If finishing the seek toward the initial moving image data, the controller 14 activates the CD-ROM decoder 12 and the MPEG decoder 13 to start the reproduction of the images recorded on the first track (T1) (Step 107).

If finishing the reproduction of all the moving images of the image data T12 within the first track (T1), the controller 14 instructs the CD drive 11 on a seek request toward the second track (T2) so as to reproduce the data recorded on the second track (T2) and the later (Steps 108 and 109). finishing the seek toward the second track, the controller 14 activates the CD-ROM decoder 12 and the MPEG decoder 13 to start the reproduction of the images recorded on the second track (T2) (Step 110). The moving images recorded in each track later than this will be sequentially reproduced.

As set forth hereinabove, according to the video CD reproduction controlling device and its controlling method of the present invention, the disk information within the first track has been retrieved in advance and the address of the image data recorded within the first track is being registered, in the reproduction of the video CD, thereby making it possible to reproduce the images recorded on the first track even in the case of controlling reproduction at the reproduction mode with the playback control off.

Further, according to the present invention, the images recorded on the first track can be reproduced at the reproduction mode with the playback control off, thereby making it possible to reproduce, still at the reproduction mode with the playback control off, even such a video CD that only the first track includes moving images and the second track and the later tracks include no moving images.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A video CD reproduction controlling device, mounted with a video CD on which at least disk reproduction information indicating reproduction procedure for reproducing moving image data compressed and encoded in a predetermined compression method, is recorded on the first track and the compressed and encoded moving image is, when present on the first track, recorded thereon, and the compressed and encoded moving image data is recorded on the second track and the later, for controlling reproduction of the moving image data recorded on the video CD, the video CD reproduction device comprising:

a CD drive, mounted with a video CD, for reading out the data recorded on the video CD;

a first decoding means for decoding the data read out through said CD drive, so to supply reproduction data;

a second decoding means for decoding the moving image data, so to supply image signals and sound signal, when the reproduction data supplied from said first decoding means is the moving image data compressed and encode nu the predetermined compression method;

a storing method for storing disk reproduction information read out from the first track, of the reproduction data supplied from said first decoding means; and a controlling means for controlling said CD drive and said first and second decoding means, said controlling means storing into said storing means, an address of moving image data recorded on the first track, included in the track, of the reproduction data supplied from said first decoding means, and controlling said CD drive and said first and second decoding means so as to reproduce the moving image data recorded on the first track by use of the address stored in said storing means, in the reproduction of the moving image data at the reproduction with playback control-off.

2. A video CD reproduction controlling device as set forth in claim 1, wherein when storing the disk reproduction information in said storing means, the address of the moving image data recorded on the first track, said controlling means checks the data recorded on the first track in every one frame, so to judge whether the data is moving image or not, and if judging that the data is moving image data, it stores the address of the data into said storing means.

3. A video CD reproduction controlling device as set forth in claim 1, wherein said controlling means controls said CD drive and said first and second decoding means so as to reproduce the moving image data recorded on the first track and thereafter controls said CD-drive and said first and second decoding means so as to sequentially reproduce the moving image data recorded on the second track and the later.

4. A video CD reproduction controlling device as set forth in claim 1, wherein said controlling means when storing the disk reproduction information in said storing means, the address of the moving image data recorded on the first track, checks the data recorded on the first track in every one frame, so to judge whether the data is moving image data or not, as if judging that the data is moving image data, it stores the address of the data into said storing means, controls said first and second decoding means so as to reproduce the moving image data recorded on the first track and thereafter controls said CD-drive and said first and second decoding means so as to sequentially reproduce the moving image data recorded on the second track and the later.

5. A video CD reproduction method for controlling reproduction of moving image data recorded on a video CD, by mounting in a CD-drive, the video CD on which as least disk reproduction information indicating reproduction procedure for reproducing moving image data compressed and encoded in a predetermined compression method, is recorded on the first track and the compressed and encoded moving image data is, when present on the first track, recorded thereon, and the compressed and encoded moving image data is recorded on the second track and the late, the video CD reproduction controlling method comprising the steps of:

a step of reading out the data recorded on the video CD mounted in the CD-drive;

a step of decoding the data read out from the video CD, so to supply reproduction data;

a step of storing an address of the moving image data recorded on the first track, included in the disk reproduction information read out from the first track, of the reproduction data; and a step acquiring the moving image data recorded on the first track by use of the recorded address, in the reproduction of the moving image data at the reproduction mode with playback control-off.

6. A video CD reproduction controlling method as set forth in claim 5, wherein said step of storing an address of the moving image data recorded on the first track includes a step of checking the data recorded on the first track in every one frame so to judge whether the data is moving image data or not, and a step of storing the address of the data when the data is judged to be moving image data.

7. A video CD reproduction controlling method as set forth in claim 5, further comprising a step of reproducing the moving image data recorded on the first track and thereafter sequentially reproducing the moving image data recorded on the second track and the later.

8. A video CD reproduction controlling method as set forth in claim 5, wherein further comprising a step of reproducing the moving image data recorded on the first track and thereafter sequentially reproducing the moving image data recorded on the second track and the later, said step of storing an address of the moving image data recorded on the first track includes a step of checking the data recorded on the first track in every one frame so to judge whether the data is moving image data or not, and a step of storing the address of the data when the data is judged to be moving image data.

9. A computer readable memory storing a control program for controlling a video CD reproduction controlling device, provided with a CD-drive for mounting a video CD on which at least disk reproduction information indicating reproduction procedure for reproducing moving image data compressed and encoded in a predetermined compression method, is recorded on the first track and the compressed and encoded moving image data is, when present on the first track, recorded thereon, and the compressed and encoded moving image data is recorded on the second track and the later, for reproducing the moving image data recorded on the video CD, the control program comprising:

a step of reading out the data recorded on the video CD mounted on the CD-drive;

a step of decoding the data read out from the video CD, so to supply reproduction data;

a step of storing an address of the moving image data recorded on the first track, included in the disk reproduction information read out from the first track, of the reproduction data; and a step of acquiring the moving image data recorded on the fist track by use of the recorded address, in the reproduction of the moving image data at the reproduction mode with playback control-off.

10. A computer readable memory as set forth in claim 9, wherein said step of storing an address of the moving image data recorded on the first track in the control program includes a step of checking the data recorded on the first track in every one frame so to judge whether the data is moving image data or not, and a step of storing the address of the data when the data is judged to be moving image data.

11. A computer readable memory as set forth in claim 9, wherein the control program further comprising a step of reproducing the moving image data recorded on the first track and thereafter sequentially reproducing the moving image data recorded on the second track and the later.

12. A computer readable memory as set forth in claim 9, wherein the control program further comprising a step of reproducing the moving image data recorded on the first track and thereafter sequentially reproducing the moving image data recorded on the second track and the later, said step of storing an address of the moving image data recorded on the first track includes a step of checking the data recorded on the first track in every one frame so to judge whether the data is moving image data or not, and a step of storing the address of the data when the data is judged to be moving image data.

* * * * *

UNITED STATES PATENT AND TRADEMARK OFFICE
CERTIFICATE OF CORRECTION

PATENT NO. : 6,205,285 B1
DATED : March 20, 2001
INVENTOR(S) : Hideki Mori

It is certified that error appears in the above-identified patent and that said Letters Patent is hereby corrected as shown below:

Column 8, claim 5,
Line 43, "as" should read -- at --
Line 50, "late" should read -- later --

Column 10, claim 9,
Line 6, "fist" should read -- first --

Signed and Sealed this

Twelfth Day of March, 2002

Attest:

Attesting Officer

JAMES E. ROGAN
Director of the United States Patent and Trademark Office